United States Patent
Nakamura (10) Patent No.: US 8,704,953 B2
(45) Date of Patent: Apr. 22, 2014

(54) VIDEO PROCESSING DEVICE AND METHOD OF VIDEO PROCESSING

(71) Applicant: Kabushiki Kaisha Toshiba, Tokyo (JP)

(72) Inventor: Masaki Nakamura, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/711,386

(22) Filed: Dec. 11, 2012

(65) Prior Publication Data

US 2013/0321706 A1 Dec. 5, 2013

(30) Foreign Application Priority Data

May 31, 2012 (JP) ................................. 2012-125263

(51) Int. Cl.
*H04N 9/73* (2006.01)

(52) U.S. Cl.
USPC .......................................... 348/655; 345/590

(58) Field of Classification Search
None
See application file for complete search history.

(56) References Cited

U.S. PATENT DOCUMENTS

| | | | |
|---|---|---|---|
| 2011/0187891 A1 | 8/2011 | Zhang | |
| 2012/0162529 A1* | 6/2012 | Ho et al. | 348/678 |
| 2012/0206654 A1* | 8/2012 | Nakamura et al. | 348/624 |

FOREIGN PATENT DOCUMENTS

| | | |
|---|---|---|
| EP | 0454417 A2 | 4/1991 |
| JP | 2000-354250 A | 12/2000 |
| JP | 2002-044681 A | 2/2002 |
| JP | 2003-299118 A | 10/2003 |
| JP | 2007-142983 A | 6/2007 |
| JP | 2009-111868 A | 5/2009 |
| JP | 2009-162946 A | 7/2009 |

OTHER PUBLICATIONS

Office Action of corresponding Japanese Patent Application 2012-125263 dated May 21, 2013 in 3 pages.
Office Action of corresponding Japanese Patent Application 2012-125263 dated Mar. 5, 2013 in 6 pages.
European Search Report of corresponding European Patent Application No. 12196170.0 dated Aug. 28, 2013 in 8 pages.

* cited by examiner

*Primary Examiner* — Jefferey Harold
*Assistant Examiner* — Samira Monshi
(74) *Attorney, Agent, or Firm* — Knobbe, Martens, Olson & Bear LLP (57) ABSTRACT

According to one embodiment, a video processing device includes: an operator configured to accept a gain adjustment value with respect to at least any one of an R signal, a G signal, and a B signal of a video signal from a user; a gain adjuster configured to obtain a gain by using a white balance adjustment value and the gain adjustment value with respect to each of the R, G, and B signals; a determiner configured to determine whether any of the gain of the R signal, the gain of the G signal, and the gain of the B signal is equal to or greater than 1; and a processor configured to decrease the gain when any of the gain of the R signal, the gain of the G signal, and the gain of the B signal is equal to or greater than 1.

6 Claims, 9 Drawing Sheets

FIG.11

VIDEO PROCESSING DEVICE AND METHOD OF VIDEO PROCESSING

CROSS-REFERENCE TO RELATED APPLICATIONS

This application is based upon and claims the benefit of priority from Japanese Patent Application No. 2012-125263, filed May 31, 2012, the entire contents of which are incorporated herein by reference.

FIELD

Embodiments described herein relate generally to a video processing device and a method of video processing.

BACKGROUND

Conventionally, in order to correct the instrumental error of a display panel or the white balance of the display panel changing by aged deterioration, a video display device such as a digital television is capable of allowing a user to adjust a gain of each of the R, G, and B signals of a video signal.

However, in such a conventional art, when the amplitude of any of the R, G, and B signals becomes large as a result of adjusting the gain of each of the R, G, and B signals, the signal is saturated by the restriction of the dynamic range of a video processing circuit block. Accordingly, in the conventional art, it is difficult to maintain the uniformity of the white balance and output a high quality video. For example, when the uniformity of the white balance in a bright region is deteriorated as a result of adjusting the gain of the B signal, the yellowing of a bright scene occurs.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, A video processing device comprises: an operator configured to accept a gain adjustment value with respect to at least any one of an R signal, a G signal, and a B signal of a video signal from a user; a gain adjuster configured to obtain a gain by using a white balance adjustment value and the gain adjustment value with respect to each of the R, G, and B signals of the video signal; a determiner configured to determine whether any of the gain of the R signal, the gain of the G signal, and the gain of the B signal is equal to or greater than 1; and a processor configured to decrease the gain when any of the gain of the R signal, the gain of the G signal, and the gain of the B signal is equal to or greater than 1.

Hereinafter, a video processing device and a method of video processing according to each embodiment is specifically explained in conjunction with the drawings. Here, in the following embodiments, the video processing device is explained by taking a digital television provided with a tuner for receiving digital broadcasting as an example. However, the embodiment is not limited to the digital television as the video processing device, and may be applied to devices such as a hard disk recorder or a set top box that comprise a tuner for receiving broadcasting waves and process and output video to a display device externally connected.

First Embodiment

Figure 1:
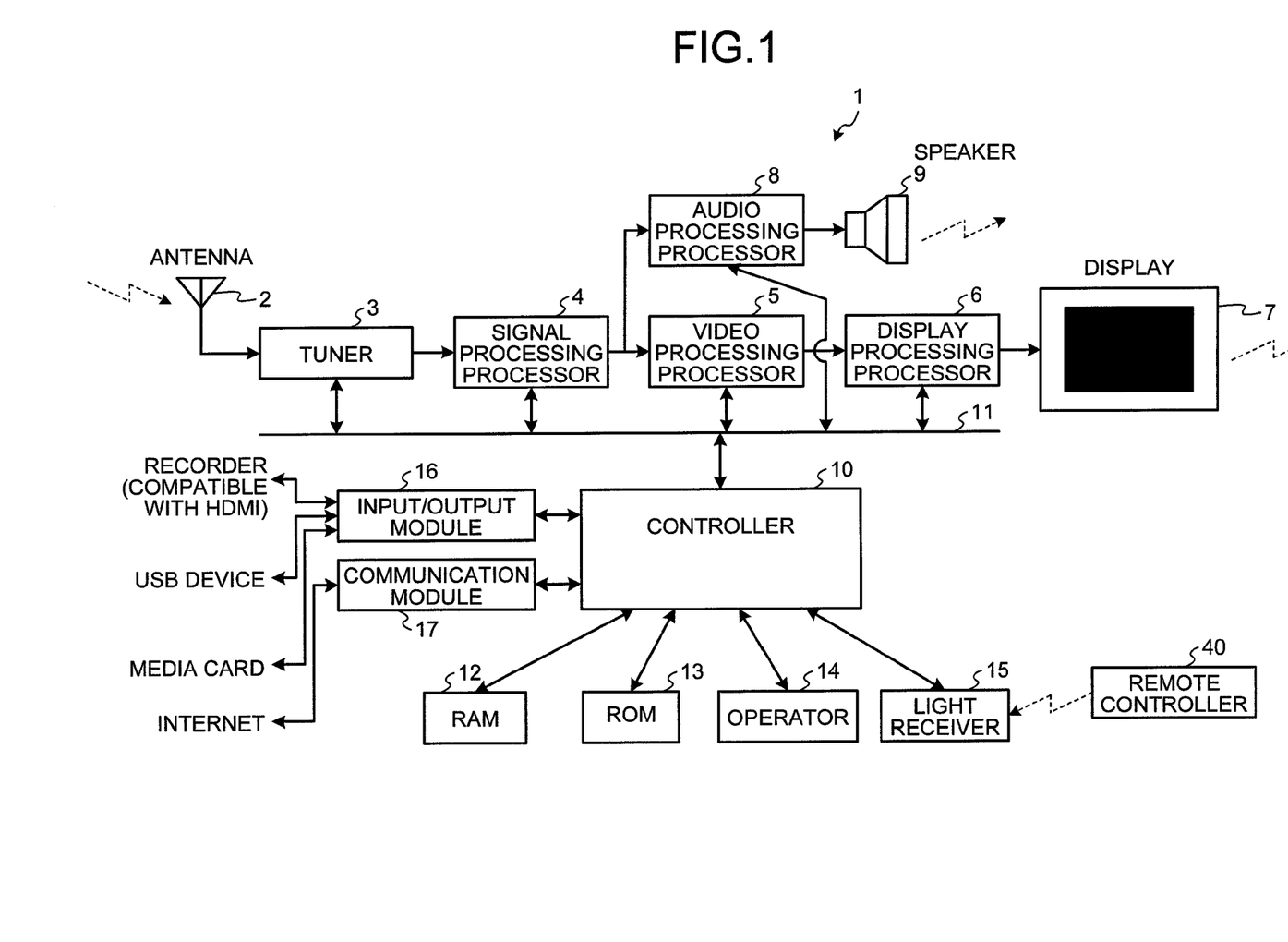
FIG. 1 is an exemplary block diagram of a digital television according to a first embodiment.

FIG. 1 is a block diagram illustrating the constitution of a digital television 1 according to a first embodiment. As illustrated in FIG. 1, the digital television 1 mainly comprises an antenna 2, a tuner 3 for receiving digital broadcasting, a signal processor 4, a video processor 5, a display processor 6, a display 7, an audio processor 8, a speaker 9, a controller 10, a communication line 11, a random access memory (RAM) 12, a read only memory (ROM) 13, an operator 14, a light receiver 15, an input/output module 16, and a communication module 17.

The antenna 2 receives digital broadcasting programs such as BS, CS, and terrestrial broadcasting programs. The tuner 3 selects a channel for viewing according to the direction from a user. The signal processor 4 takes out and processes signals demodulated in the tuner 3 or signals input from the input/output module 16 as various digital signals under the control of the controller 10. Furthermore, the signal processor 4 separates the signals input into a video signal and an audio signal, and outputs the video signal and the audio signal to the video processor 5 and the audio processor 8, respectively.

The video processor 5 performs contrast adjustments, gain adjustments (color temperature adjustments) of the R, G, and B signals according to the directions from the operator 14 by a user, and gamma correction with respect to the video signals input from the signal processor 4. Here, the contrast adjustments and the gain adjustments of the R, G, and B signals are specifically described later.

Furthermore, the video processor 5 performs processing of adjusting the video signal input from the signal processor 4 to a video signal of a correct screen size, or processing of removing noises contained in the video signal as image quality processing for improving image quality of the video, for example.

The display processor 6 further superimposes the on-screen display (OSD) of character information or the like on the video signal after being adjusted. The display 7 displays the video signal on the screen thereof. The user views the screen of the display 7 to view a television video. The audio processor 8 amplifies an audio signal while performing the sound processing of the audio signal. The speaker 9 outputs the audio signal as a sound. A viewer listens to the sound from the speaker 9 to listen to a television sound.

The controller 10 controls each module of the digital television 1. To be more specific, the controller 10 is a microcontroller, and loads programs stored in the ROM 13 into the RAM 12 to execute the programs sequentially. Hence, the controller 10 outputs a control signal to each module of the digital television 1 to centrally control the operation of the digital television 1.

The communication line 11 connects the tuner 3, the signal processor 4, the video processor 5, the display processor 6, the audio processor 8, and the controller 10 to each other so that data are transferred among the controller 10, the tuner 3, the signal processor 4, the video processor 5, the display processor 6, and the audio processor 8. To be more specific, the communication line 11 may be an IIC-BUS or the like. The RAM 12 and the ROM 13 store therein various data, and transfer these pieces of data with respect to the controller 10.

The operator 14 functions as switches that accept operational directions from a viewer. The light receiver 15 receives a signal transmitted from a remote controller 40 that accepts the operational directions from the viewer. A user operates each button of the remote controller 40 thus operating the digital television 1 and each device connected to the digital television 1. The operator 14 and the remote controller 40 function as operators of the digital television 1.

Figure 2:
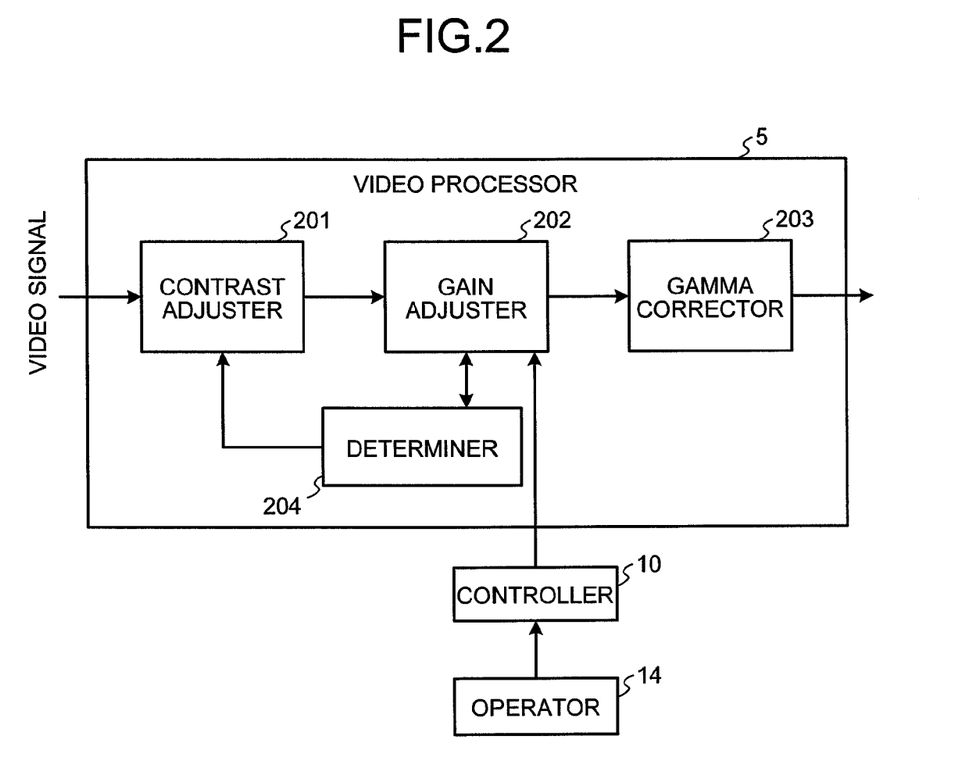
FIG. 2 is an exemplary block diagram mainly illustrating the functional constitution of a video processor in the first embodiment.

Next, the video processor 5 is explained in detail. FIG. 2 is a block diagram mainly illustrating the functional constitution of the video processor 5 in the first embodiment. Here, FIG. 2 illustrates processors of the video processor 5 for performing the contrast adjustment, and the gain adjustment and the gamma correction of each of the R, G, and B signals, and processors for adjusting the video signal input from the signal processor 4 to a video signal of a correct screen size and removing noises contained in the video signal are omitted.

The video processor 5 mainly comprises, as illustrated in FIG. 2, a contrast adjuster 201, a gain adjuster 202, a gamma corrector 203, and a determiner 204.

Figure 3:
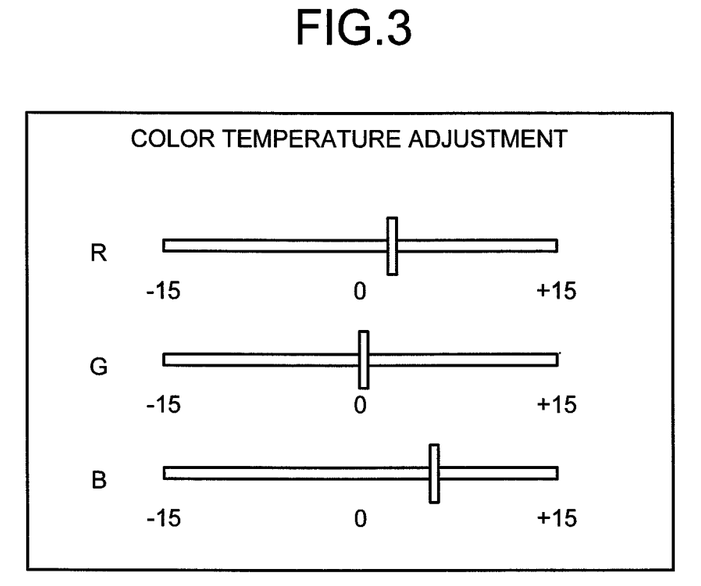
FIG. 3 is an exemplary view illustrating one example of a screen for adjusting color temperatures in the first embodiment.

FIG. 2 also illustrates the operator 14 and the controller 10. The operator 14 makes a user input a gain adjustment value for the gain adjustment of each of the R, G, and B signals via a screen for adjusting color temperatures, the screen being displayed on the display 7. FIG. 3 is a view illustrating one example of the screen for adjusting the color temperatures. As illustrated in FIG. 3, the screen for adjusting the color temperatures is capable of setting the gain adjustment value for each of the R, G, and B signals in the range from −15 to +15 in a unit as one memory.

The explanation is made again in conjunction with FIG. 2. The controller 10 successively accepts the gain adjustment value input in a unit as one memory by a user from the operator 14 to transfer the gain adjustment value to the video processor 5.

The gain adjuster 202 obtains the gain of each of the R, G, and B signals that constitute a video signal by adding a white balance adjustment value for maintaining the white balance and a gain adjustment value input from the operator 14 via the controller 10, and outputs the gain of the R signal, the gain of the G signal, and the gain of the B signal as a video signal after the gain adjustment.

Figure 4:
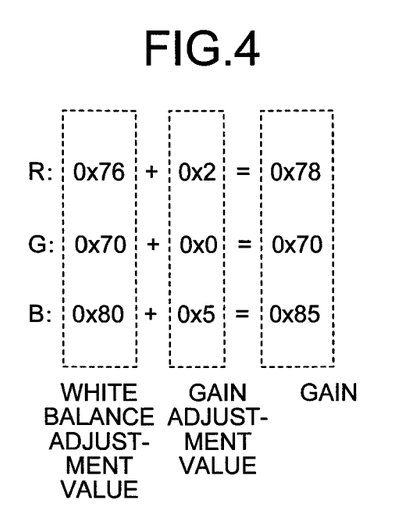
FIG. 4 is an exemplary view illustrating an example of calculating gains in a gain adjuster in the first embodiment.

FIG. 4 is a view illustrating an example of calculating gains in the gain adjuster 202. FIG. 4 illustrates an example in which in the adjustment screen of the color temperatures, the gain adjustment value is set to "+2" for the R signal, set to "0" for the G signal, and set to "+5" for the B signal. Here, in the example in FIG. 4, numerical values are expressed in hexadecimal.

The white balance of the video signal input to the gain adjuster 202 is adjusted, and a value of 0x76 for the R signal, a value of 0x70 for the G signal, and a value of 0x80 for the B signal are input to the gain adjuster 202 as white balance adjustment values. In this case, the gain adjuster 202 obtains the gain (output signal) of each of the R, G, and B signals by adding each value of the R, G, and B signals of the video signal set as the white balance adjustment value and the above-mentioned gain adjustment value specified by a user.

The determiner 204 determines whether any of the gain of the R signal, the gain of the G signal, and the gain of the B signal that are calculated in the gain adjuster 202 is equal to or greater than 1.

The contrast adjuster 201 receives a video signal from the signal processor 4 and performs a contrast adjustment with respect to the video signal. Particularly, the contrast adjuster 201 decreases, when the determiner 204 determines that any of the gain of the R signal, the gain of the G signal, and the gain of the B signal is equal to or greater than 1, the contrast value of the video signal input according to the gain or the gain adjustment value, and outputs again the video signal whose contrast value is decreased to the gain adjuster 202.

Due to such a constitution, the gain adjuster 202 calculates the gain of each of the R, G, and B signals of the video signal whose contrast value is decreased by using the gain adjustment value input from a user, and outputs the gain of the R signal, the gain of the G signal, and the gain of the B signal as the video signal after the gain adjustment. Accordingly, each of the gain of the R signal, the gain of the G signal, and the gain of the B signal becomes smaller than 1 thus maintaining the uniformity of the white balance.

As described above, when any of the gain of the R signal, the gain of the G signal, and the gain of the B signal is equal to or greater than 1, the contrast adjuster 201 decreases the contrast of the video signal after the gain adjustment and makes the gain adjuster 202 perform the gain adjustment thus performing adjustment processing for decreasing the gain of the video signal after the gain adjustment.

The explanation is made again in conjunction with FIG. 2. The gamma corrector 203 performs known gamma correction with respect to the video signal after the gain adjustment.

Figure 5:
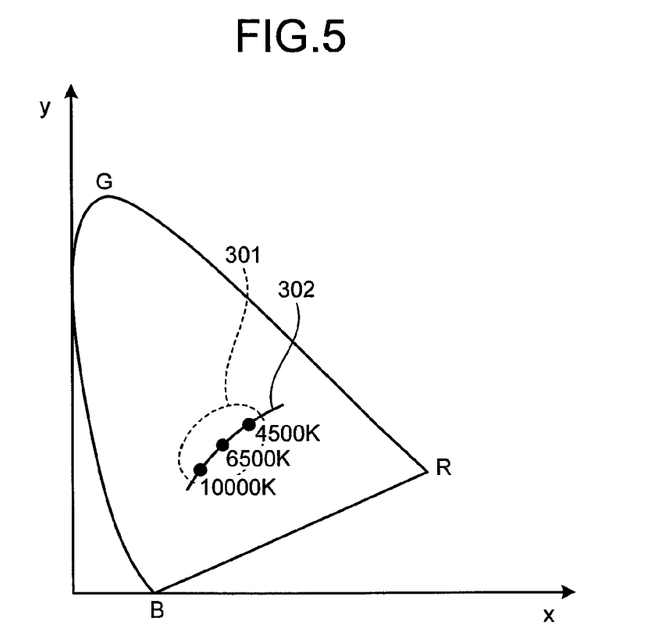
FIG. 5 is an exemplary CIE chromaticity diagram in the first embodiment.

Hereinafter, the gain adjustment and the contrast adjustment of each of the R, G, and B signals are explained in detail. FIG. 5 illustrates a CIE chromaticity diagram. In the chromaticity diagram illustrated in FIG. 5, a range 301 indicates the range of an RGB value of white, and a numeral 302 indicates a blackbody locus. The gain adjustment of each of the R, G, and B signals is performed by using a value in the range 301 of white thus maintaining the white balance.

Figure 6:
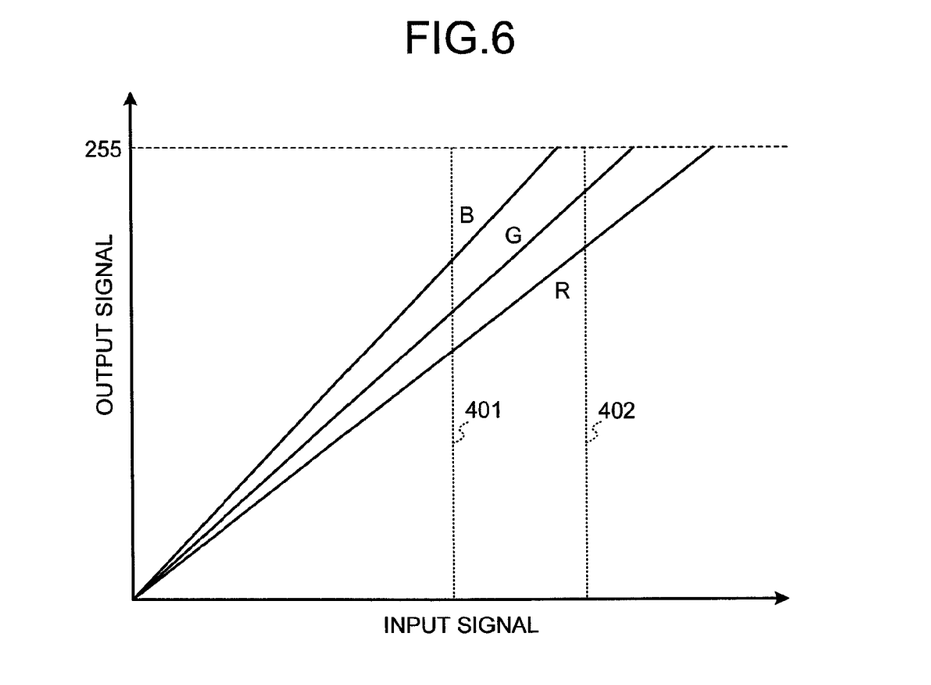
FIG. 6 is an exemplary view illustrating a relationship between inputs and outputs of R, G, and B signals in the first embodiment.

FIG. 6 is a view illustrating a relationship between inputs and outputs of each of the R, G, and B signals. In FIG. 6, each of the R, G, and B signals is designed so as to take a white balance adjustment value in the range 301 of white in FIG. 5. Therefore, as in the case of an input signal indicated by a numeral 401, when an output signal (gain) becomes equal to or smaller than a dynamic range of 255 by the gain adjustment of each of the R, G, and B signals, the white balance is maintained.

However, when any of the gain of the R signal, the gain of the G signal, and the gain of the B signal becomes equal to or greater than 1 and any of the output signals reaches 255 so as to be saturated (when the B signal reaches 255 and is saturated as in the case of an input signal indicated by a numeral 402, for example), the gain of each of the R, G, and B signals is departed from the range 301 of white illustrated in FIG. 5 in the direction toward B, the video image of the video signal turns ashen, and it is impossible to maintain the white balance.

Accordingly, in the first embodiment, when the determiner 204 determines that the gain of any of the R, G, and B signals is equal to or greater than 1, the contrast adjuster 201 decreases and outputs the contrast of the video signal to the gain adjuster 202. The gain adjuster 202 receives the video signal whose output value is lowered to perform the gain adjustment again with respect to the video signal whose output value is lowered by using the gain adjustment value specified by a user, and outputs the video signal to the gamma corrector 203 thus maintaining the white balance.

Figure 7:
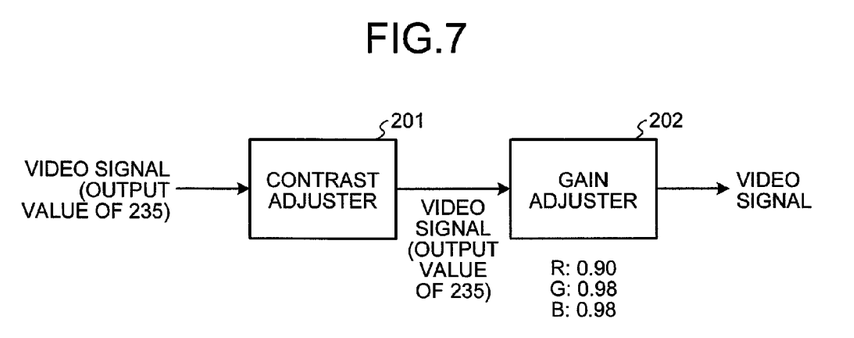
FIG. 7 is an exemplary view illustrating an example in the case where the gain of each of the R, G, and B signals is smaller than 1 in the first embodiment.

Hereinafter, the explanation is made by giving examples. FIG. 7 is a view illustrating an example in the case where the gain of each of the R, G, and B signals is smaller than 1 as a result of the gain adjustment. When a video signal having an output value of 235 is input to the contrast adjuster 201, the contrast adjuster 201 outputs the video signal to the gain adjuster 202 as it is.

The gain adjuster 202 receives the video signal that has an output value of 235 and is output from the contrast adjuster 201, and performs the gain adjustment with respect to each of the R, G, and B signals of the video signal having an output value of 235 using the gain adjustment value input from the operator 14 by a user to obtain the gain of each of the R, G, and B signals. The determiner 204 determines whether the gain of each of the R, G, and B signals is equal to or greater than 1. As illustrated in FIG. 7, the result of the determination of the determiner 204 assumes that the gain of each of the R, G, and B signals is smaller than 1.

In this case, the gain adjuster 202 outputs the video signal comprised of the R, G, and B signals after the gain adjustment to the gamma corrector 203.

Figure 8A:
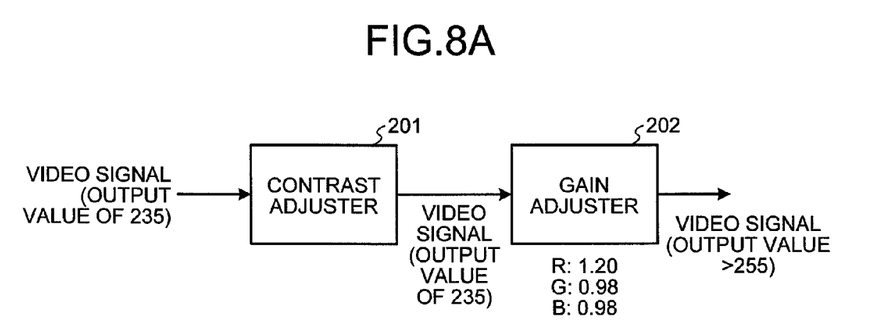
FIGS. 8A and 8B are exemplary views illustrating an example in the case where the gain of the R signal out of the R, G, and B signals is equal to or greater than 1.
Figure 8B:
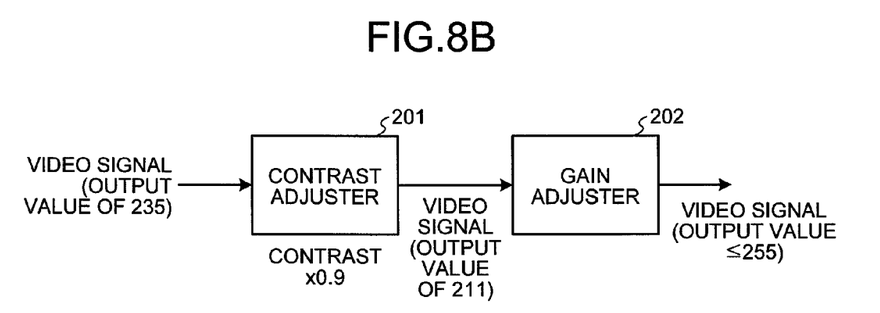

FIGS. 8A and 8B are views illustrating an example in the case where the gain of the R signal out of the R, G, and B signals is equal to or greater than 1 as a result of the gain adjustment. When the video signal having an output value of 235 is input to the contrast adjuster 201, the contrast adjuster 201 outputs the video signal to the gain adjuster 202 as it is.

The gain adjuster 202 receives the video signal that has an output value of 235 and is output from the contrast adjuster 201, and performs the gain adjustment with respect to each of the R, G, and B signals of the video signal having an output value of 235 by using the gain adjustment value input from the operator 14 by a user to obtain the gain of each of the R, G, and B signals. The determiner 204 determines whether the gain of each of the R, G, and B signals is equal to or greater than 1. As illustrated in FIG. 8A, the result of the determination of the determiner 204 assumes that the gain of the R signal is 1.20; that is, the gain of the R signal becomes equal to or greater than 1.

In this case, when the gain adjuster 202 outputs the video signal comprised of the R, G, and B signals after the gain adjustment to the gamma corrector 203 as it is, an output value exceeds a limit value of 255 of a dynamic range and it is impossible to maintain the white balance (see FIGS. 5 and 6).

Accordingly, in such a case, as illustrated in FIG. 8B, the gain adjuster 202 and the determiner 204 output the video signal comprised of the R, G, and B signals after the gain adjustment to the contrast adjuster 201. As illustrated in FIG. 8B, the contrast adjuster 201 decreases, for example, the contrast of the video signal after the gain adjustment to 0.9 to set an output value to 211. The contrast adjuster 201 outputs the video signal whose contrast is decreased and output value is 211 to the gain adjuster 202.

The gain adjuster 202 performs the gain adjustment with respect to each of the R, G, and B signals of the video signal whose contrast is decreased and output value is 211 by using a gain adjustment value that is specified by a user and equal to the gain adjustment value when the gain of the R signal is equal to or greater than 1 to obtain the gain of each of the R, G, and B signals. In this case, the contrast of the video signal input is decreased and the output value of the video signal is set to 211 and hence, even though the gain adjustment values are equal to each other, the output value of the video signal after the gain adjustment is equal to or smaller than 255. The video signal whose output value is equal to or smaller than 255 is output to the gamma corrector 203 thus maintaining the white balance.

Figure 9:
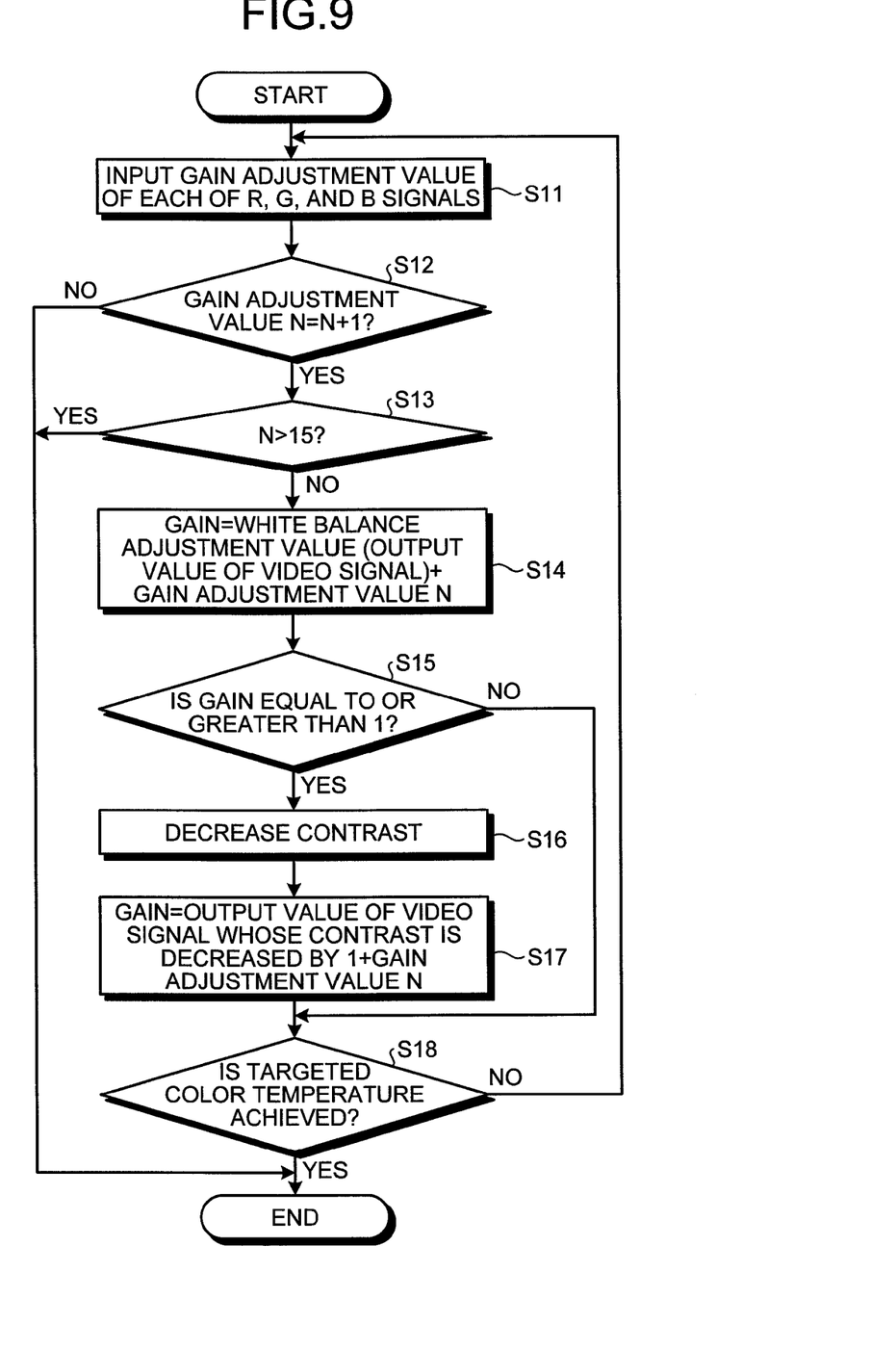
FIG. 9 is an exemplary flowchart illustrating the procedures of video processing in the first embodiment.

Next, video processing in the first embodiment constituted as described above is explained. FIG. 9 is a flowchart illustrating the procedures of the video processing in the first embodiment.

The gain adjuster 202 first receives a gain adjustment value with respect to each of the R, G, and B signals from a user via the operator 14 and the controller 10 in a unit as one memory (S11). Thereafter, the gain adjuster 202 increments a variable N indicating the gain adjustment value of each of the R, G, and B signals by one (S12).

Next, the gain adjuster 202 determines whether the gain adjustment value N of each of the R, G, and B signals exceeds a maximum value of 15 (S13). When the gain adjustment value N exceeds 15 (Yes at S13), the video processing is ended.

When the gain adjustment value N does not exceed 15 (No at S13), the gain adjuster 202 adds the gain adjustment value N to a white balance adjustment value (the output value of the video signal after the white balance is adjusted) to calculate the gain (the output value) of each of the R, G, and B signals (S14).

Next, the determiner 204 determines whether the gain of any of the R, G, and B signals is equal to or greater than 1 (S15). When the gain of any of the R, G, and B signals is equal to or greater than 1 (Yes at S15), the contrast adjuster 201 decreases the contrast of the video signal comprised of the R, G, and B signals after the gain adjustment (S16).

To be more specific, the contrast adjuster 201 decreases the contrast by 1 with an increase in the gain adjustment value of +1. However, the rate of decrease in contrast is not limited to this case.

The gain adjuster 202 adds the gain adjustment value N to the output value of the video signal whose contrast is decreased to calculate the gain (the output value) of each of the R, G, and B signals (S17).

At S15, when the gain of any of the R, G, and B signals is smaller than 1 (No at S15), the processes of S16 and S17 are skipped.

The gain adjuster 202 determines whether the predetermined targeted color temperature is achieved depending on the output value of the video signal after the gain adjustment (S18). When the predetermined targeted color temperature is not achieved (No at S18), the video processing is returned to S11 and processes from S11 to S17 are repeated.

At S18, when it is determined that the predetermined targeted color temperature is achieved depending on the output value of the video signal after the gain adjustment (Yes at S18), the video processing is ended.

In this manner, in the first embodiment, the gain adjustment is performed with respect to each of the R, G, and B signals that constitute the video signal using the gain adjustment value. As a result of the gain adjustment, when the gain of any of the R, G, and B signals is equal to or greater than 1, the contrast of the video signal after the gain adjustment is decreased and the video signal is output after the gain adjustment performed again using the gain adjustment value thus maintaining the uniformity of the white balance and outputting a high quality video signal.

Second Embodiment

In the first embodiment, the adjustment processing of decreasing the gain of the video signal after the gain adjustment is performed by decreasing the contrast of the video signal after the gain adjustment. In the second embodiment, the adjustment processing is performed by gamma correction.

Figure 10:
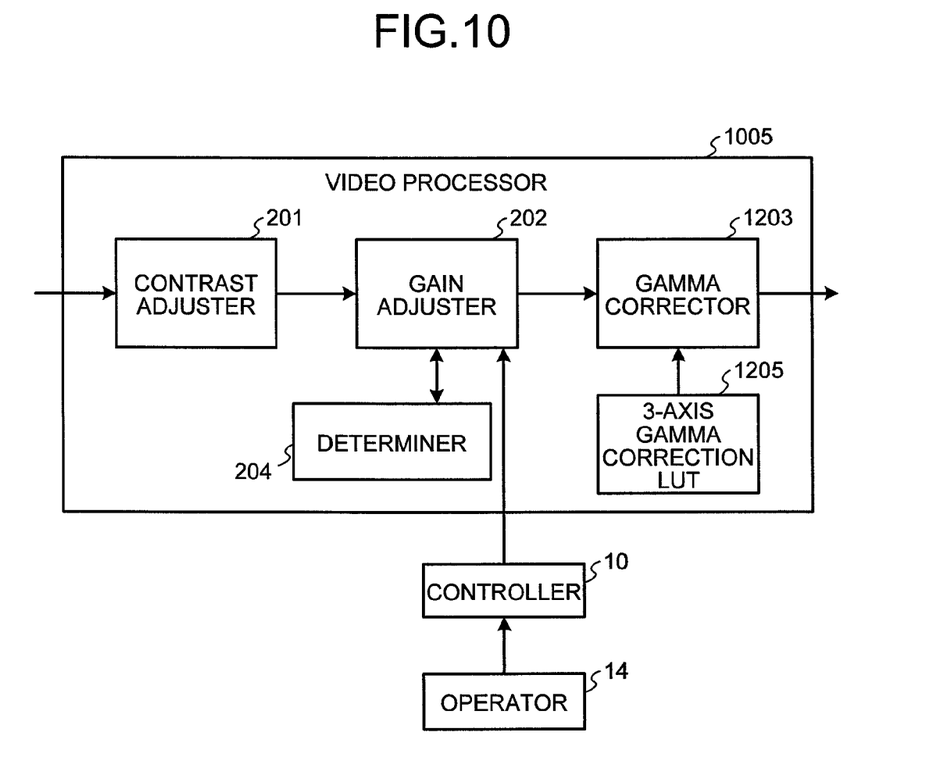
FIG. 10 is an exemplary block diagram illustrating the functional constitution of a video processor according to a second embodiment.

FIG. 10 is a block diagram illustrating the functional constitution of a video processor 1005 according to the second embodiment. Here, the constitution of the digital television 1 in the second embodiment is the same as in the first embodiment explained in conjunction with FIG. 1.

The video processor 1005 mainly comprises, as illustrated in FIG. 10, the contrast adjuster 201, the gain adjuster 202, the determiner 204, a gamma corrector 1203, and a 3-axis gamma correction look up table (LUT) 1205. Here, the functions and the constitutions of the contrast adjuster 201, the gain adjuster 202, and the determiner 204 are the same as in the first embodiment. The functions and the constitutions of the controller 10 and the operator 14 are also the same as in the first embodiment.

The gamma corrector 1203 performs, in the same manner as in the first embodiment, the gamma correction with respect to the video signal after the gain adjustment using the 3-axis gamma correction LUT 1205. Here, the 3-axis gamma correction LUT 1205 is stored in a storage medium such as a memory.

The gamma corrector 1203 in the second embodiment further adds, when the determiner 204 determines that the gain of any of the R, G, and B signals is equal to or greater than 1, an offset value to an output value having gamma characteristics corresponding to a color signal whose gain is equal to or greater than 1 in the 3-axis gamma correction LUT 1205 and performs the gamma correction.

Figure 11:
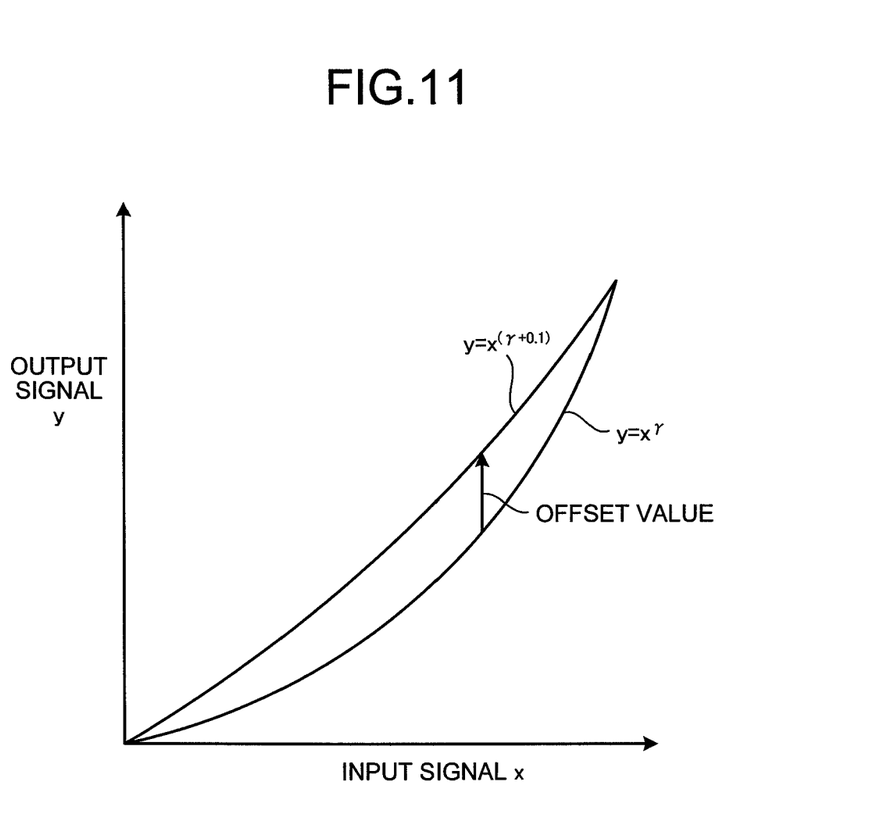
FIG. 11 is an exemplary view illustrating one example of the gamma characteristics of a display in the second embodiment.

FIG. 11 is a view illustrating one example of the gamma characteristics of a display 7. FIG. 11 illustrates, for the convenience sake in explaining the embodiment, an example of the gamma characteristics with respect to one color signal out of the R, G, and B signals. The 3-axis gamma correction LUT 1205 registers therein an input value corresponding to the inverse function of a gamma function $y=x^\gamma$ illustrated in FIG. 11 and an output value corresponding to the input value that are associated with each other.

Accordingly, while the gain is smaller than 1, the gamma corrector 1203 performs the gamma correction with respect to the video signal after the gain adjustment using the 3-axis gamma correction LUT 1205 corresponding to the inverse function of a gamma function $y=x^\gamma$.

When the gain is equal to or greater than 1, the gamma corrector 1203 gives offset values, as a gamma function $y=x^{(\gamma+0.1)}$ illustrated in FIG. 11, for example, to gamma characteristics corresponding to a color signal whose gain is equal to or greater than 1. That is, the gamma corrector 1203 gives offsets corresponding to the inverse function of the gamma function $y=x^{(\gamma+0.1)}$ to the 3-axis gamma correction LUT 1205 to change the gamma characteristics, and performs the gamma correction with respect to the video signal after the gain adjustment. Here, the gamma function illustrated in FIG. 11 is merely one example, and the second embodiment is not limited to this example.

Figure 12:
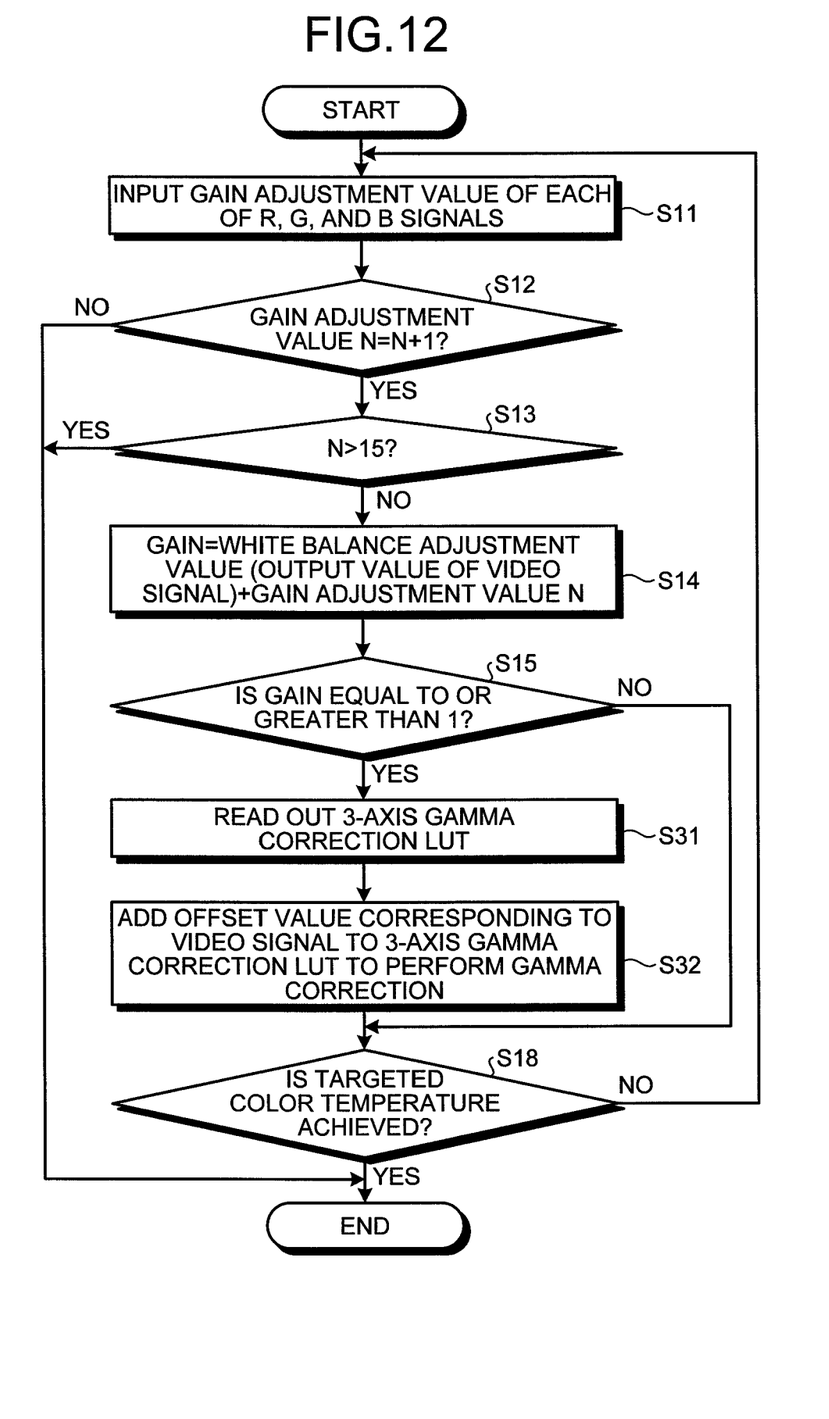
FIG. 12 is an exemplary flowchart illustrating the procedures of video processing in the second embodiment.

Next, the video processing of the second embodiment constituted in such a manner as described above is explained. FIG. 12 is a flowchart illustrating the procedures of the video processing in the second embodiment.

The processes (S11 to S15) from the step of the input of the gain adjustment value to each of the R, G, and B signals from a user to the step of determination of whether the gain becomes equal to or greater than 1 by the gain adjustment are performed in the same manner as in the case of the video processing in the first embodiment.

At S15, when the gain of any of the R, G, and B signals is equal to or greater than 1 (Yes at S15), the gamma corrector 1203 reads out the 3-axis gamma correction LUT 1205 from a memory or the like (S31). Furthermore, the gamma corrector 1203 adds an offset value corresponding to a video signal to the 3-axis gamma correction LUT 1205 read out to perform the gamma correction (S32).

At S15, when the gain of each of the R, G, and B signals is smaller than 1 (No at S15), the processes of S31 and S32 are skipped.

The gain adjuster 202 determines whether the predetermined targeted color temperature is achieved depending on the output value of the video signal after the gain adjustment (S18). When the predetermined targeted color temperature is not achieved (No at S18), the video processing is returned to S11 and processes from S11 to S32 are repeated.

At S18, when it is determined that the predetermined targeted color temperature is achieved depending on the output value of the video signal after the gain adjustment (Yes at S18), the video processing is ended.

In this manner, in the second embodiment, the gain adjustment is performed with respect to each of the R, G, and B signals that constitute the video signal using the gain adjustment value. As a result of the gain adjustment, when the gain of any of the R, G, and B signals is equal to or greater than 1, the offset value corresponding to the video signal is added to the 3-axis gamma correction LUT 1205 to perform the gamma correction thus maintaining the uniformity of the white balance and outputting a high quality video signal.

Here, in the gain adjuster 202 in the first embodiment and the second embodiment, although the gain is obtained by adding the white balance adjustment value and the gain adjustment value, the embodiments are not limited to this case. The gain may be obtained by some operations on the white balance adjustment value and the gain adjustment value.

Furthermore, in the operator 14 in the first and second embodiments, although the gain adjustment value of each of the R, G, and B signals is input by a user via the screen for adjusting the color temperatures, the embodiments are not limited to this case. The gain adjustment value of at least one of the R, G, and B signals may be input by the user.

Here, the video processors 5 and 1005 in the first and second embodiments may be realized by any of hardware and software.

When the video processors 5 and 1005 of the digital televisions 1 in the first and second embodiments are realized by software, video processing programs executed in the video processors 5 and 1005 of the digital televisions 1 in the first and second embodiments are provided in a form stored in the ROM 13 or the like in advance.

The video processing programs executed in the video processors 5 and 1005 of the digital televisions 1 in the first and second embodiments may be recorded on a computer-readable recording medium such as a CD-ROM, a flexible disk (FD), a CD-R, a digital versatile disk (DVD) or the like in the form of an installable file or an executable file and provided.

Furthermore, the video processing programs executed in the video processors 5 and 1005 of the digital televisions 1 in the first and second embodiments may be provided in a form stored on a computer connected to a network such as the Internet and downloaded via the network. In addition, the video processing programs executed in the video processors 5 and 1005 of the digital televisions 1 in the first and second embodiments may be provided or distributed via a network such as the Internet.

The video processing programs executed in the video processors 5 and 1005 of the digital televisions 1 in the first and second embodiments are configured to comprise modules including the above-mentioned respective modules (the contrast adjuster 201, the gain adjuster 202, the gamma correctors 203 and 1203, and the determiner 204). As actual hardware, a CPU reads out the video processing program from the above-mentioned ROM 13 to execute the program and hence, the above-mentioned modules are loaded on a main memory to generate the contrast adjuster 201, the gain adjuster 202, the gamma correctors 203 and 1203, and the determiner 204 on the main memory.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processing device comprising:
    an operator configured to accept a gain adjustment value with respect to at least any one of a Red (R) signal, a Green (G) signal, and a Blue (B) signal of a video signal from a user;
    a gain adjuster configured to obtain a gain by using a white balance adjustment value and the gain adjustment value with respect to each of the R, G, and B signals of the video signal;
    a determiner configured to determine whether any of the gain of the R signal, the gain of the G signal, and the gain of the B signal is equal to or greater than 1; and
    a processor configured to decrease the gain when any of the gain of the R signal, the gain of the G signal, and the gain of the B signal is equal to or greater than 1.

2. The video processing device of claim 1, wherein,
    the processor comprises a contrast adjuster configured to decrease a contrast value of the video signal when any of the gain of the R signal, the gain of the G signal, and the gain of the B signal is equal to or greater than 1; and
    the gain adjuster is configured to obtain the gain by using the white balance adjustment value and the gain adjustment value with respect to each of the R signal, the G signal, and the B signal of the video signal of which the contrast value is decreased.

3. The video processing device of claim 1, wherein,
    the processor is further comprising:
    a gamma corrector configured to perform a gamma correction when any of the gain of the R signal, the gain of the G signal, and the gain of the B signal is equal to or greater than 1, wherein the gamma correction is performed by adding a predetermined offset value to a gamma curve of a color signal whose gain is equal to or greater than 1.

4. The video processing device of claim 1, wherein the gain adjuster is configured to obtain the gain by adding the white balance adjustment value and the gain adjustment value.

5. The video processing device of claim 1, further comprising:
    a display configured to display the adjusted video signal.

6. A method of video processing comprising:
    accepting a gain adjustment value with respect to at least any one of a Red (R) signal, a Green (G) signal, and a Blue (B) signal of a video signal from a user;
    obtaining a gain by using a white balance adjustment value and the gain adjustment value with respect to each of the R, G, and B signals of the video signal;
    determining whether any of the gain of the R signal, the gain of the G signal, and the gain of the B signal is equal to or greater than 1; and
    decreasing the gain when any of the gain of the R signal, the gain of the G signal, and the gain of the B signal is equal to or greater than 1.

* * * * *